March 31, 1931. W. B. THIEMANN 1,798,231
DELIVERY CHUTE FOR GRAIN ELEVATORS
Filed April 23, 1929
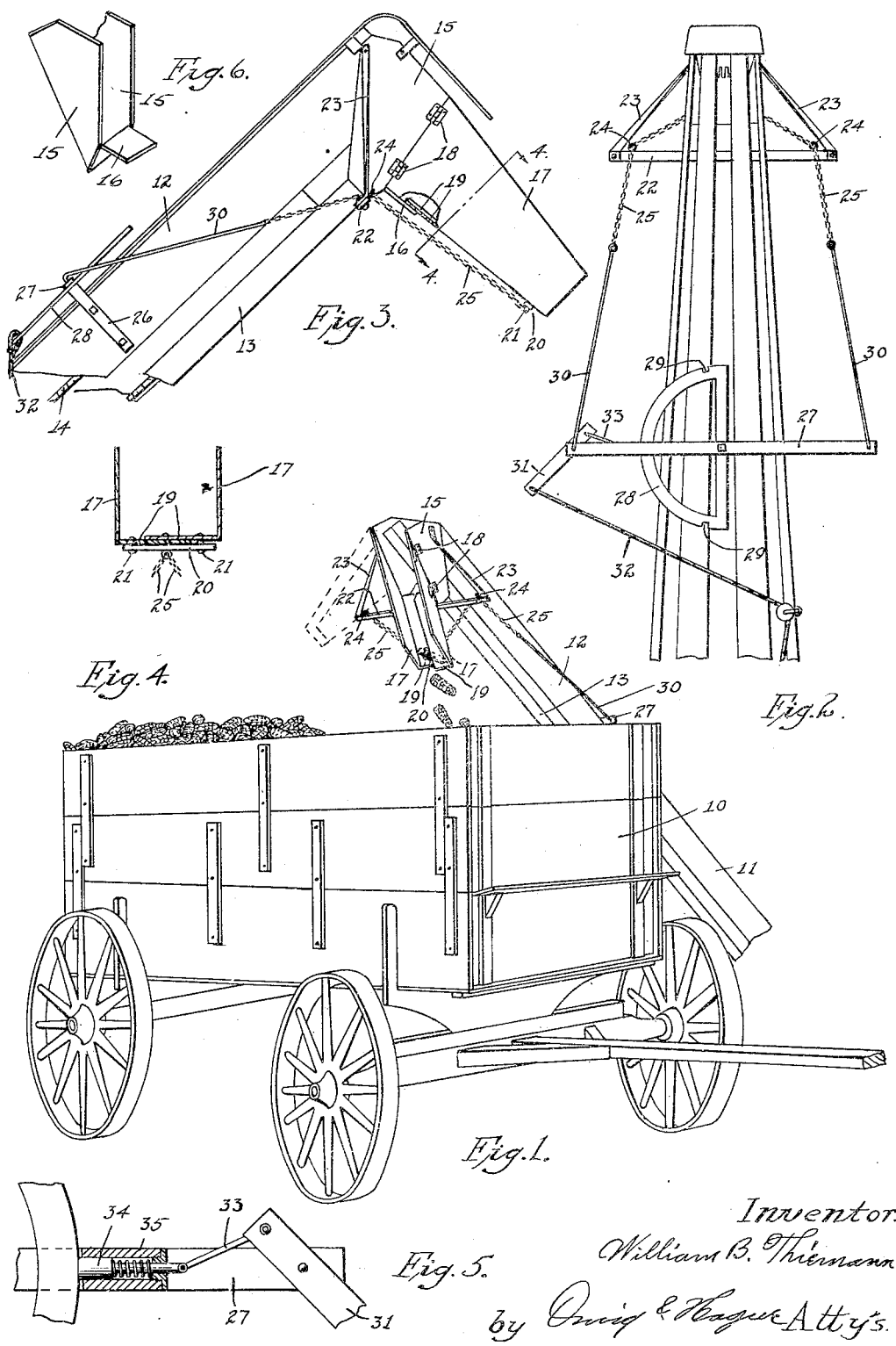
Inventor.
William B. Thiemann
by Craig & Hager Atty's.

Patented Mar. 31, 1931

1,798,231

UNITED STATES PATENT OFFICE

WILLIAM B. THIEMANN, OF ALBERT CITY, IOWA

DELIVERY CHUTE FOR GRAIN ELEVATORS

Application filed April 23, 1929. Serial No. 357,506.

This invention relates to improvements in chute attachments for elevators of that type adapted to be used in connection with harvesting machines such as corn pickers, where the wagon is drawn alongside the harvesting machine to receive the grain from the elevator, and is particularly adapted to be used when the wagon is drawn by hitch devices from the harvester or the tractor pulling the harvester, in which case a considerable difficulty has been experienced in that the grain is usually dumped near the center of the wagon, it being necessary to stop a number of times while the wagon is being loaded to move the grain to the ends of the wagon.

It is therefore the object of my invention to provide a chute adapted to be connected to the delivery end of the elevator and to swing laterally when so connected in such manner that one end of the wagon may be first loaded, after which the free end of the chute may be swung laterally and the central portion and opposite end loaded successively, without changing the position of the wagon relative to the harvester.

A further object is to provide in a chute of the class above described means whereby the chute may be swung laterally when the operator is positioned at a point remote from the wagon, for instance, while seated on the harvester machine, and to be operated while the machine is in operation.

More specifically it is the object of my invention to provide a delivery chute of simple, durable and inexpensive construction, which may be easily and quickly attached to the delivery end of the commercial harvester elevators, and when so attached adapted to have its free end swung laterally and to be frictionally retained in a number of its swinging positions.

A further object is to provide in that type of delivery chutes, which is adapted to be connected to the delivery end of an elevator and to have its free end swung laterally, improved means for operating said delivery chute from a remote position.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a perspective view of a grain wagon showing a portion of a grain elevator in operative relation and the manner in which my improved device is applied to said elevator.

Figure 2 is a top view of the delivery end of the elevator showing the manner in which my device is applied thereto.

Figure 3 is a side elevation of the delivery end of a grain elevator showing in elevation my improved attachment applied thereto.

Figure 4 is a detail sectional view taken on the line 4—4 of Figure 3.

Figure 5 is a detail view of the locking device, a portion of the pawl supporting case being shown in section.

Figure 6 is a perspective view of the stationary portion of my device.

The numeral 10 indicates a grain wagon, and 11 an elevator such as used on corn pickers. Said elevator comprises a trough portion having side members 12 and a conveyor guide 13 for supporting the lower run of a conveyor 14.

My improved device comprises a pair of stationary side members 15, having their lower ends connected by a bottom member 16. Said bottom member extends a slight distance beyond the lower edges of the side members. The side members 15 are rigidly secured to the outer faces of the side members 12 of the elevator, with the bottom member 16 at such position to receive the grain from the conveyor 14. Said bottom member is inclined downwardly and outwardly, as clearly illustrated in Figure 3.

To each of the lower edges of the side members 15 a side member 17 of my improved chute is pivotally connected by means of hinges 18. The bottom edge of each of the side members 17 is provided with an inwardly extending bottom member 19. The bottom members 19 are supported in overlapping positions in the manner illustrated in Figure 4, and have their upper ends overlapping the lower end of the bottom member 16.

The free ends of the overlapping members are connected by means of a link 20 secured to said bottom members by rivets or other suitable pivot devices 21. The link 20 retains the side members and the overlapping bottom members in substantially parallel relation regardless of the angular position of said chute relative to the elevator. The link 20 also prevents the free ends of said side members 17 from inwardly and outwardly swinging movement.

Supported beneath the upper end of the member 13 is a cross bar 22, which has its free end rigidly supported by means of suitable braces 23. Each end of the bar 22 is provided with an eyelet or loop 24 for receiving chains 25. The ends of said chains 25 are connected to the central portion of the link 20 and provides means whereby the free end of the chute formed by the side members 17 and the bottom members 19 may be swung laterally by pulling on one of said chains and releasing the other.

Secured to the sides 12 of the conveyor is a bracket 26 designed to support a transversely arranged bar 27. The bar 27 is pivotally connected to said bracket and also to a sector frame 28. Each end of the periphery of said sector is provided with a notch 29. Each end of the bar 27 is provided with a link 30. Said links make connection with the chains 25 in the manner shown in Figure 2.

One end of the bar 27 is provided with a latch operating lever 31 having an operating rope 32 connected to one end. The other end of the lever 31 is provided with a link 33 which operates a spring actuated pawl 34 mounted in a suitable casing 35 secured to the under surface of the bar 27. The free end of the pawl 34 is designed to frictionally engage the periphery of the sector 28 and also to enter the notches 29 when opposite said notches.

The bar 27, the links 30 and the chains 25 provide means whereby the free end of the chute may be oscillated or swung laterally by simply rocking said bar upon its pivot. The pawl 34 locks the bar in either of its extreme limits of movement and consequently locks the chute in either of its extreme swinging positions of movement. This is desirable and necessary, due to the fact that the hinge centers of the chute are inclined from a vertical in such manner that as the free end of the chute is swung sidewise or laterally, the free end of the chute will be elevated and would have a tendency, due to gravity, to assume a position in a common plane with the elevator. The frictional contact between the pawl 34 and the sector 28 is sufficient to support the chute in any of its intermediate positions of movement.

In practical operation the grain wagon is moved to position beneath the discharge end of the chute with the elevator 11 substantially midway between the ends of the wagon, after which the chute is swung preferably toward the rear end of the wagon and allowed to latch. The cable 32 is mounted in suitable guide pulleys, so that the cable may be attached to the picker or the tractor which operates the picker in such manner that when the rear end of the wagon has become filled, the operator simply pulls on the rope, which in turn will cause the lever 31 to be actuated, releasing the pawl 34 from the notch 29, and at the same time imparting movement to the arm 27 to swing the chute forwardly. After the chute has been moved the desired distance, the rope is released and the chute retained in said position by frictional contact of the pawl 34 with the sector 28. This operation may be repeated as often as desired until the wagon has become filled.

The chute is moved to an operative position by the operator within the wagon at the time the wagon is placed in position. The rope 32 is only utilized to swing the chute forwardly. It will readily be seen that the device can be arranged to move the free end of the chute in the opposite direction if so desired.

Thus it will be seen that I have provided a chute attachment for elevators which may be easily and quickly applied, and when applied provided with means whereby the chute may be controlled by an operator at a position remote from the wagon, and thereby eliminate the necessity of the operator stopping the harvesting machine a number of times in order to level the grain within the wagon.

I claim as my invention:

1. In combination, a grain elevator, a discharge chute at the delivery end of said elevator mounted to have its free end swing laterally, spring actuated means for frictionally clamping said chute in a number of its swinging positions of movement, and a rope controlled device for releasing said friction clamping means and at the same time imparting lateral swinging movement to said chute.

2. In combination, a grain elevator, a discharge chute at the delivery end of said elevator mounted to have its free end swing laterally, means for frictionally retaining said chute in a number of its positions of movement, means for locking said chute in each of its limited positions of movement, and a device controlled by a single rope for unlatching said locking means for releasing said friction clamping means and for imparting swinging movement to said chute.

3. A chute attachment for grain elevators comprising a body portion having side members, and a narrow bottom member, a chute member hinged to one edge of each side member, each of said chute members having a bottom portion, one of said portions overlapping the other, the upper ends of both of said portions overlapping said bottom member, a link for pivotally connecting the free ends of said bottom members, and a rope controlled mechanism for imparting lateral swinging movement to said chute members.

4. A chute attachment for grain elevators comprising a body portion having side members and a narrow bottom member, a chute member hinged to one edge of each side member, each of said chute members having a bottom portion, one of said portions overlapping the other, the upper ends of both of said portions overlapping said bottom member, a link for pivotally connecting the free ends of said bottom members, a rope controlled mechanism for imparting lateral swinging movement to said chute members, said rope controlled mechanism including means for locking said chute members in either of their limited positions of movement, and means controlled by the swinging movement of said rope devices for releasing said latching means and for simultaneously swinging said chute members.

5. A chute attachment for grain elevators comprising a body portion having side members, a chute member hinged to one edge of each side member, each of said chute members having a bottom portion, one of which overlaps the other, a link for pivotally connecting the free ends of said bottom members, and a rope controlled mechanism for imparting lateral swinging movement to said chute members.

6. A chute attachment for grain elevators comprising a body portion having side members, a chute member hinged to one edge of each side member, each of said chute members having a bottom portion, one of which overlaps the other, a link for pivotally connecting the free ends of said bottom members, a rope controlled mechanism for imparting lateral swinging movement to said chute members, and means for locking the chute members in a number of their positions of movement.

7. In combination, an inclined elevator frame, a chute secured to the upper end of said frame, means for pivotally mounting one end of said chute to said elevator whereby its free end will swing laterally, a cross bar secured to the free end of said chute, a lever pivoted transversely across the body of said elevator, link devices for connecting the ends of said lever with the ends of said cross bar, a sector for pivotally supporting said lever having a notch at each end, a second lever pivoted to one end of said first lever, a pawl carried by said lever device to engage the periphery of said sector and to enter said notches, a spring for frictionally retaining said pawl in engagement with said sector, a link for connecting said pawl with one end of said second lever, and a rope connected to the free end of said second lever.

WILLIAM B. THIEMANN.